United States Patent Office 3,483,075
Patented Dec. 9, 1969

3,483,075
ADHESIVE FOR REINFORCING RUBBER
Theophil D. Schmitt, Ambler, Pa., assignor to Rohm & Haas Company, Philadelphia, Pa., a corporation of Delaware
No Drawing. Filed Oct. 27, 1966, Ser. No. 589,805
Int. Cl. B32b 25/12; C09j 3/12
U.S. Cl. 161—227                                11 Claims

ABSTRACT OF THE DISCLOSURE

The invention relates to adhesive compositions comprising a mixture of:
(a) a copolymer formed from methyl acrylate, a monoester of a monoethylenically unsaturated dicarboxylic acid and a monoethylenically unsaturated hydroxyl-group containing monomeric material with
(b) a blend of a phenolic-aldehyde resin and a rubber latex,
to methods for bonding reinforcing elements to rubbery compositions using the adhesive compositions, and to articles and laminates formed by these methods.

---

This invention relates to novel adhesive compositions, to methods for bonding reinforcing elements such as textile materials to rubbery compositions using said novel adhesives, and to the article or laminate formed by said methods. More particularly, this invention relates to an improved phenolic-aldehyde-rubber latex (R-F-L) adhesive composition having certain improved properties, such as greater latex stability, relatively low viscosity and increased pot-life, in addition to superior adhesive capability.

A copending application, filed of same date by J. Brodnyan, assigned to a common assignee, discloses an adhesive composition consisting of a multifunctional copolymer having carboxylate-group and hydroxyl-group functionality mixed with a blended phenolic-aldehyde-rubber latex composition.

There is a need for improved adhesives in the bonding of synthetic reinforcing fibers, such as viscose rayon, nylon and polyester fibers, to rubber and the like in order to effect a strong bonding between the reinforcing fibers and rubber, both at normal and at elevated temperatures. In the manufacture of such reinforced articles as pneumatic tires, power-drive belts, conveyor belts, high pressure hose and the like, the useful life of these articles depends to a great extent upon the bond secured between the reinforcing element or cord and the rubber.

Various adhesives are disclosed in the prior art for bonding a reinforcing element, usually a textile material, to rubber. Recent patents relating to the bonding of tire cord to rubber involve the use of a resorcinol-aldehyde resin blended with a rubber latex. Basically the adhesive consists of an aqueous system comprising a rubber latex and a phenolic resin which causes the tire cord (usually a textile material) to adhere to the rubber because of the composite nature of the adhesive. The phenolic resin adheres strongly to the textile material, and the rubber latex adheres by vulcanization to the rubber that is to be bonded to the textile material.

This type of adhesive has been modified in a variety of ways. For example, instead of allowing the complete condensation of the phenol-aldehyde resin to take place within the composite structure of the adhesive during the vulcanizing procedure, the phenol-aldehyde condensate has been preformed by condensing a phenol with an aldehyde in an aqueous medium in the presence of an acid catalyst. In another instance, the tire cord has been treated first in a liquor comprising functional compounds having at least two ethylene-urea groups and two ethylene-urethane groups. United States Patents 3,190,764 and 3,247,043 disclose the use of a polyepoxide in a so-called pre-dip adhesive. United States Patent 3,240,659 discloses the first impregnation of the tire cord with an organic polyisocyanate, while United States Patent 3,226,276 discloses a first treatment with a phenolic-aldehyde deficient resin followed by treatment with resorcinol-formaldehyde-rubber latex in which the resol had been blocked by a polyisocyanate. In addition to the above, the prior art discloses tire cord adhesives comprising an incompletely condensed phenolic resin and a copolymer of a conjugated diene and an unsaturated ketone, or a butadiene-acrylonitrile latex. A tire cord adhesive comprising an etherified polymethylolamine and a rubber latex has also been disclosed.

Use of the above disclosed adhesives and their corresponding methods for bonding tire cord to rubber entails certain serious disadvantages. For example, first treating the tire cord with a liquor containing dissolved or dispersed isocyanates requires large quantities of isocyanate and is costly; moreover, there is a problem of toxicity. Moreover, many of the prior art methods require two or more dipping steps which adds to the processing cost.

It is an object of this invention to provide a reinforcing element-to-rubber adhesive composition having improved bonding capabilities. It is another object of this invention to provide an adhesive composition for bonding a reinforcing element, such as textile material, to rubber having a relatively high solids content within a usable viscosity range. It is still another object of this invention to provide an adhesive composition having relative stability or freedom from excessive thickening or gelling on quiescent standing. It is still a further object of this invention to provide a method for bonding or laminating a reinforcing element, such as textile material, to rubber (natural or synthetic).

In accordance with this invention the above objects are carried out by mixing a copolymer of an ethylenically unsaturated dicarboxylic acid monoester, an ethylenically unsaturated hydroxyl group-containing monomer which will hereinafter be referred to as the hydroxylic monomer, and methyl acrylate with a blend of a phenolic-aldehyde condensation product and a rubber latex to form an adhesive composition having the capability of bonding a reinforcing element, such as textile material, to natural or synthetic rubber. The dicarboxylic acid monoester containing copolymer is formed from a mixture of monomeric material comprising up to 5 weight percent of dicarboxylic acid monoester, up to 20 weight percent of the hydroxyl group-containing monomer, and the balance methyl acrylate. The weight ratio of the dicarboxylic acid monoester to the ethylenically unsaturated hydroxyl group-containing material is from about 1 to 4 to about 1 to 20, based on their individual weights in the initial monomeric material. Thus, the copolymer is formed from about 75 to 90% by weight of methyl acrylate, about 1 to 5% by weight of the dicarboxylic acid monoester, and about 4 to 20% by weight of the ethylenically unsaturated hydroxyl-group containing material. Surprisingly, it has been discovered that the presence of methyl acrylate as the backbone material of the copolymer is specific. Certain other materials having the hardness of methyl acrylate, when substituted for methyl acrylate in the copolymer, do not provide an adhesive composition that is superior in respect to the reinforcing element-to-rubber bond produced as compared to the bond produced by the unmodified phenolic-aldehyde-rubber latex. The ratio in the adhesive composition of the dicarboxylic acid monoester containing copolymer to the blended phenolic-aldehyde-rubber latex is from about 5 to 95 to about 30 to 70, based on the weights of the solids. The dicarboxylic acid monoester containing copolymer is mixed directly with the phenolic-aldehyde resin-rubber latex and applied to the reinforcing element in a one-stage or single-treatment process. There is no need to prime the textile material before it is coated with the adhesive composition of this invention. This affords various obvious advantages over the sequential treatments of the prior art. The improved adhesive of this invention may be applied to the reinforcing element in any suitable fashion, such as dipping as will be described more fully hereinbelow; then the components of the lamination are joined and the resulting composite is treated under vulcanizing conditions to convert the adhesive resin to the infusible state.

It has been discovered that the adhesive compositions of this invention exhibit an unexpectedly stronger reinforcing element-to-rubber bond than the R-F-L adhesive compositions presently used in the rubber and tire industry. The adhesive compositions of this invention possess surprisingly low viscosities within the copolymer to R-F-L blend ratio supra, and the viscosity remains stable, which contributes to a relatively long pot-life. The adhesive compositions of this invention produce a stronger reinforcing element-to-rubber bond than is produced by prior art adhesives.

The viscosity of the adhesive composition of this invention varies in accordance with the proportional weight relationship of the dicarboxylic acid monoester containing copolymer to the R-F-L blend. For example, at a ratio of 5 parts by weight of a copolymer incorporating a dicarboxylic acid monoester, such as of methyl hydrogen itaconate, to 95 parts by weight R-F-L blend, based on the weights of the solids, the initial viscosity is about 7.5 centipoises (cps.) at 20 percent solids. The initial viscosity at a ratio of 10:90 copolymer to R-F-L is about 10 cps. at 20 percent solids. At a ratio of 15:85 copolymer to R-F-L, the initial viscosity is about 15 cps. at 20 percent solids. The viscosity of the adhesive composition of the copending application supra is similar to the viscosity of the adhesive composition of this invention at or below the 5:95 copolymer to R-F-L blend ratio; however, within the range of from about 5:95 to about 30:70 the adhesive composititon of this invention exhibits a lower viscosity, greater stability and longer pot-life than the adhesive compositions of the copending application supra. For example, after 20 hours of quiescent standing, the viscosity of an adhesive composition according to the copending application supra consisting of 20 weight percent multifunctional copolymer comprising carboxylic (e.g. acrylic acid) and hydroxyl functionality and 80 weight percent of an R-F-L latex blend is about 340 cps., while the viscosity of an adhesive composition of this invention having the same 20:80 ratio after 20 hours quiescent standing is only about 50 cps. Similarly, the viscosity of the 20:80 adhesive composition of the copending application after 40 hours quiescent standing is about 650 cps., while the viscosity of the 20:80 adhesive of this invention after 40 hours quiescent standing is only about 105 cps. This ability of the adhesive composition of the present invention to resist thickening or gelling on long periods of standing, such as a period of several hours or day, is an unexpected advantage in addition to the primary advantage of providing an improved reinforcing element-to-rubber bond.

It is not certain why the adhesive composition of this invention exhibits a relatively low viscosity, greater stability and a relatively long pot-life. This phenomenon may be caused by the location of the dicarboxylic acid monoester in the copolymer of said acid-ester. Solubility considerations make it not unreasonable to assume that the carboxylic groups of the acid-ester species are buried within the copolymer particles, whereas, for example, the copolymer of the copending application that is mixed with the R-F-L blend has its carboxylic groups distributed around the periphery of the copolymer particles. This situation of acid-ester concealment in the dicarboxylic acid monoester copolymer affords a time dependency for salt formation caused by the interaction of the acid group of the buried acid-ester with the alkaline species contained in the R-F-L copolymer blend. Said salt formation results in particle swelling which subsequently leads to increased viscosity and ultimate gellation. Thus, the additional time requirement in the case of the dicarboxylic acid monoester copolymer R-F-L blend affords longer pot-life of the adhesive composition. This explanation is offered merely as an aid to understanding the present invention and is not intended in any way to limit this invention to any particular mode of operation.

Representative of the monoester of ethylenically unsaturated dicarboxylic acids that form a part of this invention are the monoesters of itaconic acid, such as, methyl hydrogen itaconate, butyl hydrogen itaconate, lauryl hydrogen itaconate, the monoesters of alpha-methylene glutaric acid, the monoesters of fumaric acid, the monoesters of maleic acid, and the monoesters of other polymerizable dicarboxylic acids.

Representative of the hydroxyl-group containing monomeric material are beta-hydroxypropylmethacrylate, beta-hydroxypropylacrylate, beta - hydroxyethylmethacrylate, beta-hydroxyethylacrylate, and other polymerizable unsaturated alcohols.

Representative of the rubber latex component of the adhesive improved by this invention are natural rubber, copolymers of vinyl pyridines and diene hydrocarbons, such as a copolymer of 2-vinyl pyridine/butadiene, vinyl pyridine/isoprene, 5-ethyl-2-vinyl pyridine/butadiene, 5-ethyl-2-vinyl pyridine/isoprene, copolymers of butadiene/styrene, butadiene/styrene/acrylonitrile, butadiene/acrylonitrile, butadiene/styrene/chloroprene, butadiene/styrene/vinyl pyridine and mixtures thereof. See United States Patent Re. 23,451 for other suitable rubber latices.

The phenolic-aldehyde component or resol includes any condensation product of an aldehyde with a monomeric phenol which, under the influence of heat, becomes permanently infusible. The preferred resol is an adduct of resorcinol and formaldehyde. See United States Patent Re. 23,451 for other suitable resols.

The manner of blending the rubber latex with the phenolaldehyde heat convertible resol is disclosed in United States Patent Re. 23,451. In the practice of this invention, blends of the rubber latex and the phenol/aldehyde resin containing from 10% to 90% resin may be employed. In general, for tire cord application, it is preferred to operate within the range of 20% to 60% resin, particularly from 25% to 40% resin.

The copolymer containing the monester of an ethylenically unsaturated dicarboxylic acid is mixed with the phenol-aldehyde-rubber latex (R-F-L) blend in the ratio (based on the weights of the solids) of about 5:95 to about 30:70. Optimum adhesion is obtainable when the copolymer/R-F-L ratio is from about 10:90 to about 20:80. The relative proportion of the R-F-L component to the monoester containing copolymer will vary according to the specific dicarboxylic acid monoester or hydroxyl-group containing materials that are present in the copolymer. It has been discovered that in the monoester containing copolymer component of the adhesive excellent results are obtained when the proportional relationship between the hydroxyl-group containing material and the dicarboxylic acid monoester is in the ratio of from about 4:1 to 20:1.

Many different reinforcing cords are used to reinforce rubber, including those made from a regenerated cellulosic material, such as viscose rayon or cuprammonium cellulose rayon; a polyamide, such as nylon; a polyester, such as Dacron (a high molecular weight polyethylene terephthalate); a metal, such as steel; and others. The preferred reinforcing cords in this invention are textile materials which will be more fully defined hereinbelow.

Among the rubber compounds to be reinforced as used in this invention are polymers of isoprene, such as natural rubbers and synthetic rubbers which include vulcanizable polymers of a conjugated diene including butadiene, a butadiene/styrene copolymer, a butadiene/acrylonitrile copolymer (acrylonitrile/butadiene/styrene), polymers of chloroprene, such as Neoprene, butyl rubbers containing a major proportion of isobutylene with a minor amount of butadiene, and stereorubbers, such as cis-1,4-polyisoprene and cis-1,4-polybutadiene.

The improved adhesive of this invention may be applied to the tire cord in any convenient fashion, e.g. by dipping, padding or spraying. The amount of adhesive material applied to the tire cord will vary depending, for example, upon the weight and construction of the tire cord material. Typically the amount of add-on solids to be applied to the textile material will usually fall within the range of from 1 to 25% by weight of the reinforcing cord, but it will be realized that the specific amount of add-on solids necessary to give maximum bonding will vary from one situation to another. In a dipping process, the concentration of the adhesive composition, the travelling speed of the reinforcing cord through it, and the tension under which the cord is held are adjusted so that after drying, the cord has a coating of dried adhesive composition within the 1 to 25% range supra. The preferred range of pick-up or amount of add-on solids is from about 6 to 15% by weight of the reinforcing cord.

The impregnated reinforcing cord is then subjected to a drying treatment, preferably within a tunnel in which hot air is circulating, both in order to eliminate the moisture contained in the coating and to complete the condensation of the phenolic resin contained in the adhesive composition. Consequently, the drying operation is conveniently carried out at a temperature within the range of 120° to 250° C. and for a time sufficient to allow the complete conversion of the resin to an insoluble and infusible product.

In the case of reinforcing cord consisting of textile materials formed from synthetic fibers, such as, for example, polyamide fibers, which require a heat treatment for their stabilization, this treatment may be effected by passing the textile material through two or more heating zones at different temperatures so as to allow a regular carrying out of the operations of drying and stretching as is already known in the art.

The expression "textile material" as used herein includes any thread, yarn, cord or fabric obtained from natural fibers, fibers of regenerated cellulose or synthetic fibers, such as, for instance, those produced from polyamide or polyester resins.

The treated and dried textile material is then incorporated with the vulcanizable rubber compound to which it is to be bonded. Such a compound may be prepared with natural rubber or with any synthetic rubber obtained by polymerization or copolymerization of suitable organic compositions, and may also contain the usual ingredients necessary for vulcanization, such as fillers and the like.

The incorporation of the textile material in the compound of vulcanizable rubber may be carried out using various known methods; for example, a rubber layer may be applied by calendering onto one or both faces of the treated and dried textile material.

The product obtained may be used for the production of moulded composite articles constituted by rubber and fabrics, such as, for example, pneumatic tires, belts, tubes and the like.

During the moulding of such articles, at a suitable temperature, the vulcanization of the rubber compound of which they are made takes place, and at the same time, the vulcanizable component of the bonding agent is also vulcanized by means of vulcanizing agents migrating from the rubber compound.

To assist those skilled in the art to practice the present invention, the following modes of operation are suggested by way of illustration, parts and percentages being by weight and the temperatures in degrees C. unless otherwise specifically noted.

In the examples below, the measure of the strength of bonding between the reinforcing cord material and the rubber to be reinforced is determined by tests made in accordance with the method known as the "U-Hot-Test," devised, together with the appropriate apparatus, by Goodyear Tire & Rubber Co. and disclosed at the 79th Meeting of the American Chemical Society in Louisville, Ky. from Apr. 19 to 21, 1961, and described in United States Patent 3,226,276.

EXAMPLE 1

(A) 11.6 gms. resorcinol and 12.8 gms. formaldehyde are dissolved in 311.6 gms. water to give a resol solution.

(B) A mixture of 75 parts of butadiene and 25 parts of 2-vinyl pyridine is emulsified in 157 parts of an aqueous solution containing 4 parts of sodium oleate, 0.5 part of sodium hydroxide, 1 part of a formaldehyde/sodium naphthalene sulfonate condensation product, 1 part of potassium persulfate and 0.1 part of potassium ferricyanide. One half (½) part of lauryl mercaptan is added and the emulsion is heated for twenty hours at 40° C. in a sealed, glass lined vessel equipped for efficient agitation. The resulting smooth latex is treated with an antitoxidant consisting of 2 parts of a phenyl-alpha-naphthylamine and diphenylamine (55/45) mixture dispersed in water. The dispersion contains about 40% solids.

(C) A 40% solids 75/25 butadiene/styrene rubbery copolymer is prepared in the same way as the polymer of (B) supra.

(D) 10.0 gms. of sodium hydroxide is added to the resol solution of (A) supra to catalyze resin formation, and immediately thereafter, 125 gms. of the butadiene/vinyl pyridine latex of (B) and 125 gms. of the styrene/butadiene latex of (C) is added to the resol solution (A).

The resulting blend is aged between 12 and 24 hours. Thereafter, it is diluted to about 20% solids.

(E) A dicarboxylic acid monoester containing copolymer is synthesized by employing a two-charge polymerization technique with a redox system and a nonionic emulsifier.

RECIPE

| Materials | Charge 1 | Charge 2 |
|---|---|---|
| Water, deionized (mls.) | 3,000 | 1,500 |
| Sodium lauryl sulfate (gms.) | 20 | 10 |
| Octylphenoxypolyethoxyethanol* (gms.) | 400 | 135 |
| Methyl acrylate (gms.) | 2,800 | 2,800 |
| Hydroxypropyl methacrylate (gms.) | 750 | 750 |
| Butyl hydrogen itaconate (gms.) | 185 | 185 |
| Sodium formaldehyde sulfoxylate (gms.) | 100 | 60 |
| Potassium persulfate (gms.) | 100 | 35 |
| FeSO$_4$.7H$_2$O (gms.) | 0.5 | |
| Tertiary-butyl hydroperoxide (gms.) | 80 | 20 |

*Octylphenoxypolyethoxyethanol having 40 oxyethylene units.

The reactor is flushed with nitrogen. The materials of charge 1 are added and the polymerization medium is stirred until it cools to about 35° C. The materials of charge 2 are added and the polymerization medium is again stirred until the reaction is completed. The final product is then cooled and filtered. The latex of dicarboxylic acid monoester containing copolymer is diluted to about 20% solids.

(F) The emulsion copolymer of (E) is mixed with the R-F-L blend of (D) in the weight ratio of 5:95 (based on the weight of the solids). The pH is adjusted to about 6 with ammonium hydroxide. Some of the carboxylic functionality may be neutralized to the salt form, such as the carboxylic groups at the periphery of the polymer particle, but the degree of neutralization is minimus.

EXAMPLE 2

(A) A nylon tire cord of conventional construction is passed under slight tension through the adhesive composition obtained in Example 1(F) at the rate of six feet per minute. It is then dried under about 5 pounds tension for about 1.5 minutes in air at about 215° C. The treated nylon cord is then distributed in a reinforcing fashion throughout a conventional, uncured synthetic rubber (GR-S) stock, which is a commercial synthetic rubber composed approximately of a 75%–25% butadiene/styrene interpolymer prepared according to United States Patent 1,938,731. The ends of the cord are embedded in the rubber stock and the cord projects from the rubber stock in the form of a loop. The whole assembly is cured in a mold at 150° C., under 10,000 pounds pressure for 20 minutes. After conditioning overnight, the loops are then connected to an Instron tensile tester and the laminate is heated at 120° C. for 3 minutes. A tensile force is applied to the loop and increased until one of the legs of the cord is removed from the rubber. The force necessary to pull the ends of the cord from the rubber is about 27.5 pounds.

(B) A similar pull test is conducted on a laminate comprising a cord that is treated in the same way as in part (A) hereof but with merely the blend of Example 1(D) (standard R-F-L dip). The tensile force necessary to pull the end of the cord from the rubber is only about 22.0 pounds.

EXAMPLE 3

An adhesive composition is formulated in the same way as in Example 1, except the emulsion copolymer obtained in 1(E) is modified by using 165 gms. of lauryl hydrogen itaconate instead of 185 gms. of butyl hydrogen itaconate in each charge.

EXAMPLE 4

A Dacron tire cord of conventional construction is used in place of the nylon cord of Example 2. The Dacron cord is treated with the adhesive composition obtained in Example 3 in the same way that the nylon cord is treated in Example 2. The measure of the strength of the bond between the reinforcing cord material and the rubber to be reinforced is determined in the same way as in Example 2. The force necessary to pull the ends of the cord from the rubber is about 1.5 pounds. A similar pull test on a laminate comprising a Dacron cord that is treated with merely the standard R-F-L dip alone requires a tensile force necessary to pull the end of the cord from the rubber of only about 1.0 pound.

EXAMPLE 5

An adhesive composition is formulated in the same way as in Example 1, except the ratio of the emulsion copolymer of 1(E) to the blend of 1(D) is 30:70.

EXAMPLE 6

A nylon tire cord similar to the one used in Example 2 is treated with the adhesive composition obtained in Example 5 in the same way as the cord is treated in Example 2. The pull tests are conducted in the same way as Example 2.

The force necessary to pull the ends of the cord from the rubber is about 28.0 pounds. The force necessary to pull the ends of the cord treated with merely the standard R-F-L dip from the rubber is only about 23.0 pounds.

EXAMPLE 7

An adhesive composition is formulated in the same way as in Example 1, except the emulsion copolymer obtained in 1(E) is modified by using 75 gms. of methyl hydrogen itaconate in each charge instead of 185 gms. of butyl hydrogen itaconate, and the ratio of the emulsion copolymer of 1(E) to the blend of 1(D) is 15:85.

EXAMPLE 8

A nylon tire cord similar to the one used in Example 2 is treated with the adhesive composition obtained in Example 7 in the same way as the cord is treated in Example 2. The pull tests are conducted in the same way as Example 2.

The force necessary to pull the ends of the cord from the rubber is about 29.5 pounds. The force necessary to pull the ends of the cord treated with merely the standard R-F-L dip from the rubber is only about 22.0 pounds.

EXAMPLE 9

A rayon tire cord of conventional construction is used in place of the nylon cord of Example 2. The rayon cord is treated with the adhesive composition obtained in Example 3 in the same way that the nylon cord is treated in Example 2.

It is to be understood that changes and variations may be made without departing from the spirit and scope of the invention as defined by the appended claims.

I claim:
1. An adhesive comprising a mixture of:
   (a) about 5% to about 30% by weight of a copolymer of about 75% to about 95% by weight methyl acrylate, about 1% to about 5% by weight of a monoester of a monoethylenically unsaturated dicarboxylic acid, and about 4% to about 20% by weight of a monoethylenically unsaturated hydroxyl-group containing monomeric material with
   (b) about 70% to about 95% by weight of a blend of about 10% to about 90% by weight of a phenolic-aldehyde resol in a latex of a natural rubber or a diene polymer rubber.
2. An adhesive in accordance with claim 1 in which the carboxylic groups are partially neutralized to the salt form.
3. A method of treating a textile material reinforcing element to improve the bond obtained when the treated textile material is bonded to a natural or synthetic rubber composition to form a composite structure in which the textile material serves as a reinforcement which comprises impregnating the textile material with a liquid adhesive composition as claimed in claim 1 to form a coating of adhesive composition that after drying amounts to 1 to 25% by weight based on the weight of the textile material, drying the coated textile material, and curing the dried coated textile material in adhesive contact with said rubber composition whereby the textile material is bonded to the rubber.
4. An adhesive in accordance with claim 1 in which the blend (b) is an aqueous dispersion of the reaction product of the resol and the latex.
5. A rubber reinforcing material comprising essentially a textile fabric material carrying from about 1 to 25 weight percent of residual solids retained from a composition consisting essentially of a mixture of:
   (a) about 5% to about 30% by weight of a copolymer of about 75% to about 95% by weight methyl acrylate, about 1% to about 5% by weight of a monoester of a monoethylenically unsaturated dicarboxylic acid, and about 4% to about 20% by weight of a monoethylenically unsaturated hydroxyl-group containing monomeric material with
   (b) about 70% to about 95% by weight of a blend of about 10% to about 90% by weight of a phenolic-aldehyde resol in a latex of a natural rubber or a diene polymer rubber.
6. A method for improving the rubber adhesive properties of textile materials by treatment in a one-stage or single-treatment process wherein the textile material is coated with an adhesive composition comprising a mixture of:
   (a) about 5% to about 30% by weight of a copolymer of about 75% to about 95% by weight methyl acrylate, about 1% to about 5% by weight of a monoester of a monoethylenically unsaturated dicarboxylic acid, and about 4% to about 20% by weight of a monoethylenically unsaturated hydroxyl-group containing monomeric material with
   (b) about 70% to about 95% by weight of an aqueous dispersion of the reaction product of about 10% to about 90% by weight of a phenolic-aldehyde resol and about 90% to about 10% by weight of a latex of a natural rubber or a diene polymer rubber.

7. A laminated article comprising a solid material bonded to a solid material by an adhesive comprised of a mixture of:
   (a) about 5% to about 30% by weight of a copolymer of about 75% to about 95% by weight methyl acrylate, about 1% to about 5% by weight of a monoester of a monoethylenically unsaturated dicarboxylic acid, and about 4% to about 20% by weight of a monoethylenically unsaturated hydroxyl-group containing monomeric material with
   (b) about 70% to about 95% by weight of a blend of about 10% to about 90% by weight of a phenolic-aldehyde resol in a latex of a natural rubber or a diene polymer rubber.

8. An article in accordance with claim 7 in which a reinforcing element is bonded to an elastomer by said adhesive.

9. A method of adhering textile material to an elastomer stock comprising treating the textile material with an adhesive comprising a mixture of:
   (a) about 5% to about 30% by weight of a copolymer of about 75% to about 95% by weight methyl acrylate, about 1% to about 5% by weight of a monoester of a monoethylenically unsaturated dicarboxylic acid, and about 4% to about 20% by weight of a monoethylenically unsaturated hydroxyl-group containing monomeric material with
   (b) about 70% to about 95% by weight of a blend of about 10% to about 90% by weight of a phenolic-aldehyde resol in a latex of a natural rubber or a diene polymer rubber.

10. A method as claimed in claim 9 wherein the textile material is formed from a polyamide fiber.

11. A method as claimed in claim 9 wherein the textile material is formed from a polyester resin.

References Cited
UNITED STATES PATENTS

| | | | |
|---|---|---|---|
| 2,819,237 | 1/1958 | Daniel | 260—29.3 |
| 3,068,121 | 12/1962 | Weschler | 260—29.3 |

MURRAY TILLMAN, Primary Examiner

JOHN C. BLEUTGE, Assistant Examiner

U.S. Cl. X.R.

117—161; 152—330; 156—110, 335; 161—231, 241 243, 248, 255; 260—3, 4, 29.3, 844, 845, 846, 887